(12) United States Patent
Sako et al.

(10) Patent No.: US 8,311,654 B2
(45) Date of Patent: Nov. 13, 2012

(54) CONTENT REPRODUCING APPARATUS, AUDIO REPRODUCING APPARATUS AND CONTENT REPRODUCING METHOD

(75) Inventors: Yoichiro Sako, Tokyo (JP); Kenichi Makino, Kanagawa (JP); Akane Sano, Tokyo (JP); Katsuya Shirai, Kanagawa (JP); Motoyuki Takai, Tokyo (JP); Makoto Inoue, Tokyo (JP)

(73) Assignee: Sony Corporation, Tokyo (JP)

( * ) Notice: Subject to any disclaimer, the term of this patent is extended or adjusted under 35 U.S.C. 154(b) by 1272 days.

(21) Appl. No.: 11/702,483

(22) Filed: Feb. 5, 2007

(65) Prior Publication Data
US 2007/0204744 A1  Sep. 6, 2007

(30) Foreign Application Priority Data
Feb. 17, 2006  (JP) .................................. 2006-040052

(51) Int. Cl.
*G06F 17/00* (2006.01)
(52) U.S. Cl. ..................... 700/94; 360/73.05; 360/73.06; 360/73.07; 360/78.01; 360/78.07; 482/3; 482/8; 482/9; 84/611; 84/612
(58) Field of Classification Search ...................... 700/94
See application file for complete search history.

(56) References Cited

U.S. PATENT DOCUMENTS

| | | | |
|---|---|---|---|
| 4,776,323 A | 10/1988 | Spector | |
| 5,002,491 A | 3/1991 | Abrahamson et al. | |
| 5,119,474 A | 6/1992 | Beitel et al. | |
| 5,137,501 A | 8/1992 | Mertesdorf | |
| 5,648,627 A | 7/1997 | Usa | |
| 6,157,744 A | 12/2000 | Nagasaka et al. | |
| 6,230,192 B1 | 5/2001 | Roberts et al. | |
| 6,336,891 B1 | 1/2002 | Fedrigon et al. | |
| 6,349,275 B1 | 2/2002 | Schumacher et al. | |
| 6,389,222 B1 | 5/2002 | Ando et al. | |
| 6,390,923 B1 | 5/2002 | Yoshitomi et al. | |
| 6,408,128 B1 | 6/2002 | Abecassis | |
| 6,570,078 B2 | 5/2003 | Ludwig | |
| 6,578,047 B1 | 6/2003 | Deguchi | |
| 6,662,231 B1 | 12/2003 | Drosset et al. | |
| 6,697,824 B1 | 2/2004 | Bowman-Amuah | |
| 6,704,729 B1 | 3/2004 | Klein et al. | |

(Continued)

FOREIGN PATENT DOCUMENTS
EP   1 039 400 A2   9/2000

(Continued)

OTHER PUBLICATIONS

Chang et al., Overview of the MPEG-7 standard. IEEE Transactions on Circuits and Systems for Video Technology. Jun. 2001;11(6):688-695.

(Continued)

*Primary Examiner* — Paul McCord
(74) *Attorney, Agent, or Firm* — Wolf, Greenfield & Sacks, P.C.

(57) ABSTRACT

A content reproducing apparatus is disclosed which includes: a sensor; a discrimination circuit configured to discriminate whether a movement of a user is a first movement or a second movement based on a detection output from the sensor; a storage configured to store contents; a reproduction circuit configured to reproduce the contents; and a control circuit configured to supply the reproduction circuit with contents retrieved from the storage in accordance with a discrimination output from the discrimination circuit.

18 Claims, 11 Drawing Sheets

U.S. PATENT DOCUMENTS

| | | |
|---|---|---|
| 6,757,482 B1 | 6/2004 | Ochiai et al. |
| 6,807,558 B1 | 10/2004 | Hassett et al. |
| 6,813,438 B1 | 11/2004 | Bates et al. |
| 6,839,680 B1 | 1/2005 | Liu et al. |
| 6,868,440 B1 | 3/2005 | Gupta et al. |
| 6,944,542 B1 | 9/2005 | Eschenbach |
| 6,944,621 B1 | 9/2005 | Collart |
| 7,161,887 B2 | 1/2007 | Snow et al. |
| 7,260,402 B1 | 8/2007 | Ahmed |
| 7,293,066 B1 | 11/2007 | Day |
| 7,320,137 B1 | 1/2008 | Novak et al. |
| 7,346,920 B2 | 3/2008 | Lamkin et al. |
| 7,395,549 B1 | 7/2008 | Perlman et al. |
| 7,451,177 B1 | 11/2008 | Johnson et al. |
| 7,464,137 B2 | 12/2008 | Zhu et al. |
| 7,521,623 B2 | 4/2009 | Bowen |
| 7,521,624 B2 * | 4/2009 | Asukai et al. ................. 84/612 |
| 7,542,816 B2 * | 6/2009 | Rosenberg ....................... 700/94 |
| 7,546,626 B2 | 6/2009 | Ohnuma |
| 7,790,976 B2 | 9/2010 | Takai et al. |
| 7,930,385 B2 | 4/2011 | Takai et al. |
| 2001/0010754 A1 | 8/2001 | Ando et al. |
| 2001/0014620 A1 | 8/2001 | Nobe et al. |
| 2001/0015123 A1 | 8/2001 | Nishitani et al. |
| 2001/0043198 A1 | 11/2001 | Ludtke |
| 2001/0055038 A1 | 12/2001 | Kim |
| 2002/0056142 A1 | 5/2002 | Redmond |
| 2002/0073417 A1 | 6/2002 | Kondo et al. |
| 2002/0085833 A1 | 7/2002 | Miyauchi |
| 2002/0104101 A1 | 8/2002 | Yamato et al. |
| 2002/0152122 A1 | 10/2002 | Chino et al. |
| 2003/0007777 A1 | 1/2003 | Okajima et al. |
| 2003/0018622 A1 | 1/2003 | Chau |
| 2003/0026433 A1 | 2/2003 | Matt |
| 2003/0034996 A1 | 2/2003 | Li et al. |
| 2003/0060728 A1 | 3/2003 | Mandigo |
| 2003/0065665 A1 | 4/2003 | Kinjo |
| 2003/0069893 A1 | 4/2003 | Kanai et al. |
| 2003/0088647 A1 | 5/2003 | ShamRao |
| 2003/0093790 A1 | 5/2003 | Logan et al. |
| 2003/0113096 A1 | 6/2003 | Taira et al. |
| 2003/0126604 A1 | 7/2003 | Suh |
| 2003/0163693 A1 | 8/2003 | Medvinsky |
| 2003/0212810 A1 | 11/2003 | Tsusaka et al. |
| 2004/0000225 A1 | 1/2004 | Nishitani et al. |
| 2004/0044724 A1 | 3/2004 | Bell et al. |
| 2004/0049405 A1 | 3/2004 | Buerger et al. |
| 2004/0064209 A1 | 4/2004 | Zhang |
| 2004/0126038 A1 | 7/2004 | Aublant et al. |
| 2004/0220830 A1 | 11/2004 | Moreton et al. |
| 2004/0252397 A1 | 12/2004 | Hodge et al. |
| 2004/0255335 A1 | 12/2004 | Fickle et al. |
| 2004/0259529 A1 | 12/2004 | Suzuki |
| 2005/0041951 A1 | 2/2005 | Inoue et al. |
| 2005/0102365 A1 | 5/2005 | Moore et al. |
| 2005/0126370 A1 | 6/2005 | Takai et al. |
| 2005/0241465 A1 | 11/2005 | Goto |
| 2005/0249080 A1 | 11/2005 | Foote |
| 2005/0278758 A1 | 12/2005 | Bodlaender |
| 2005/0288991 A1 | 12/2005 | Hubbard et al. |
| 2006/0078297 A1 | 4/2006 | Nishikawa et al. |
| 2006/0087925 A1 | 4/2006 | Takai et al. |
| 2006/0107822 A1 * | 5/2006 | Bowen ............................ 84/612 |
| 2006/0112411 A1 | 5/2006 | Takai et al. |
| 2006/0174291 A1 | 8/2006 | Takai et al. |
| 2006/0189902 A1 | 8/2006 | Takai et al. |
| 2006/0190413 A1 | 8/2006 | Harper |
| 2006/0220882 A1 | 10/2006 | Makino |
| 2006/0243120 A1 | 11/2006 | Takai et al. |
| 2006/0245599 A1 | 11/2006 | Regnier |
| 2006/0250994 A1 | 11/2006 | Sasaki et al. |
| 2007/0005655 A1 | 1/2007 | Takehara et al. |
| 2007/0025194 A1 | 2/2007 | Morse et al. |
| 2007/0044010 A1 | 2/2007 | Sull et al. |
| 2007/0067311 A1 | 3/2007 | Takai et al. |
| 2007/0074253 A1 | 3/2007 | Takai et al. |
| 2007/0074619 A1 * | 4/2007 | Vergo ............................. 84/612 |
| 2007/0085759 A1 | 4/2007 | Lee et al. |
| 2007/0098354 A1 | 5/2007 | Ando et al. |
| 2007/0186752 A1 | 8/2007 | Georges et al. |
| 2007/0221045 A1 | 9/2007 | Terauchi et al. |
| 2007/0265720 A1 | 11/2007 | Sako et al. |
| 2008/0153671 A1 | 6/2008 | Ogg et al. |
| 2008/0263020 A1 | 10/2008 | Takehara et al. |
| 2009/0028009 A1 | 1/2009 | Johnson et al. |

FOREIGN PATENT DOCUMENTS

| | | |
|---|---|---|
| EP | 1 128 358 A1 | 8/2001 |
| EP | 1 160 651 A1 | 12/2001 |
| EP | 1 320 101 A2 | 6/2003 |
| EP | 1 503 376 A2 | 2/2005 |
| EP | 1 705 588 A | 9/2006 |
| EP | 1 729 290 A | 12/2006 |
| EP | 1 746 520 A2 | 1/2007 |
| JP | 04-044096 A | 2/1992 |
| JP | 05-273971 A | 10/1993 |
| JP | 06-249977 A | 9/1994 |
| JP | 06-290574 A | 10/1994 |
| JP | 07-064547 A | 3/1995 |
| JP | 07-110681 A | 4/1995 |
| JP | 08-131425 A | 5/1996 |
| JP | 08-152880 A | 6/1996 |
| JP | 08-286663 A | 11/1996 |
| JP | 08-322014 A | 12/1996 |
| JP | 08-328555 A | 12/1996 |
| JP | 09-107517 A | 4/1997 |
| JP | 10-055174 A | 2/1998 |
| JP | 10-124047 A | 5/1998 |
| JP | 10-254445 A | 9/1998 |
| JP | 11-126067 A | 5/1999 |
| JP | 2000-003174 A | 1/2000 |
| JP | 2000-020054 A | 1/2000 |
| JP | 2000-207263 A | 7/2000 |
| JP | 3088409 B2 | 7/2000 |
| JP | 2000-214851 A | 8/2000 |
| JP | 2000-285059 A | 10/2000 |
| JP | 2001-022350 A | 1/2001 |
| JP | 3147888 B2 | 1/2001 |
| JP | 2001-075995 A | 3/2001 |
| JP | 2001-166772 A | 6/2001 |
| JP | 2001-282813 A | 10/2001 |
| JP | 2001-297090 A | 10/2001 |
| JP | 2001-299980 | 10/2001 |
| JP | 2001-321564 A | 11/2001 |
| JP | 2001-324984 A | 11/2001 |
| JP | 2001-325787 A | 11/2001 |
| JP | 2001-357008 A | 12/2001 |
| JP | 2001-359096 A | 12/2001 |
| JP | 2002-023746 A | 1/2002 |
| JP | 2002-049631 A | 2/2002 |
| JP | 2002-092013 A | 3/2002 |
| JP | 2002-108918 A | 4/2002 |
| JP | 2002-189663 A | 7/2002 |
| JP | 2002-238022 A | 8/2002 |
| JP | 2002-251185 A | 9/2002 |
| JP | 2002-282227 A | 10/2002 |
| JP | 2002-330411 A | 11/2002 |
| JP | 2003-023589 A | 1/2003 |
| JP | 2003-037856 A | 2/2003 |
| JP | 2003-050816 A | 2/2003 |
| JP | 2003-058770 A | 2/2003 |
| JP | 2003-085888 A | 3/2003 |
| JP | 2003-108154 A | 4/2003 |
| JP | 2003-150173 A | 5/2003 |
| JP | 2003-157375 A | 5/2003 |
| JP | 2003-162285 A | 6/2003 |
| JP | 2003-177749 | 6/2003 |
| JP | 2003-224677 A | 8/2003 |
| JP | 2004-073272 A | 3/2004 |
| JP | 2004-078467 A | 3/2004 |
| JP | 2004-139576 A | 5/2004 |
| JP | 2004-151855 A | 5/2004 |
| JP | 2004-173102 A | 6/2004 |
| JP | 2004-185535 A | 7/2004 |
| JP | 2004-199667 A | 7/2004 |
| JP | 2004-222239 A | 8/2004 |
| JP | 2004-226625 A | 8/2004 |

| | | | |
|---|---|---|---|
| JP | 2004-234807 A | 8/2004 |
| JP | 2004-240252 A | 8/2004 |
| JP | 2004-526372 A | 8/2004 |
| JP | 2004-252654 A | 9/2004 |
| JP | 2004-259313 A | 9/2004 |
| JP | 2004-259430 A | 9/2004 |
| JP | 3598613 B2 | 9/2004 |
| JP | 2004-282775 A | 10/2004 |
| JP | 2004-317819 A | 11/2004 |
| JP | 2004-326840 A | 11/2004 |
| JP | 2004-361713 A | 12/2004 |
| JP | 2004-362145 A | 12/2004 |
| JP | 2004-362489 A | 12/2004 |
| JP | 2004-362601 A | 12/2004 |
| JP | 2005-004604 A | 1/2005 |
| JP | 2005-043916 A | 2/2005 |
| JP | 2005-062971 A | 3/2005 |
| JP | 2005-084336 A | 3/2005 |
| JP | 2005-093068 A | 4/2005 |
| JP | 2005-107867 A | 4/2005 |
| JP | 2005-156641 | 6/2005 |
| JP | 2005-196918 A | 7/2005 |
| JP | 2005-202319 A | 7/2005 |
| JP | 2007-149218 A | 6/2007 |
| NL | 1023191 C2 | 10/2004 |
| WO | WO 93/22762 A1 | 11/1993 |
| WO | WO 01/82302 A1 | 11/2001 |
| WO | WO 02/05124 A1 | 1/2002 |
| WO | WO 02/080524 A2 | 10/2002 |
| WO | WO 02/093344 A1 | 11/2002 |
| WO | WO 03/043007 A2 | 5/2003 |
| WO | WO 2004/023358 A1 | 3/2004 |
| WO | WO 2004/077706 A1 | 9/2004 |
| WO | WO 2004/077760 A1 | 9/2004 |

OTHER PUBLICATIONS

Hawley, Structure out of sound. MIT PhD Thesis. 1993, pp. 1-185.

Koike et al., "Timeslider: An Interface to specify time point", Proc. of the ACM 10$^{th}$ Annual Symposium on User Interface Software and Technology, Oct. 17, 1997, p. 43-44, Alberta, Canada.

Little et al., "A digital on-demand video service supporting content-based queries," http://portal.acm.org/ft_gateway.cfm?id=168450&type=pdf&coll=GUIDE&dl=GUIDE&CFID=16 387603 &CFTOKEN=17953305, Proc. of the First ACM International Conference on Multimedia, New York, Aug. 1, 1993, 9 pages, XP-002429294.

McParland et al., Exchanging TV-anytime metadata over IP networks. Document AN462 submitted to the TV-anytime forum, Sep. 17, 2002, pp. 1-38.

O'Keeffe, Karl, Dancing monkeys. Masters project. Jun. 18, 2003, pp. 1-66.

Zhang et al., "Database and metadata support of a web-based multimedia digital library for Medical Education," http://www.springerlink.com/content/69Ohg1rxv19gwy2q/fulltext.pdf, Proc. of the First International Conference on Advances in Web-based Learning, ICWL 2002, China, Aug. 17, 2002, pp. 339-350, XP002429295.

* cited by examiner

FIG.2

CONVERSION TABLE CNVTBL

| TEMPO [bpm] | TEMPO NO.(TN) |
|---|---|
| 0 TO 69 | 1 |
| 70 TO 119 | 2 |
| 120 TO 139 | 3 |
| 140 TO 159 | 4 |
| 160 TO 179 | 5 |
| 180 TO 209 | 6 |
| 210 TO 999 | 7 |

FIG.3

| PLAY LISTS | PL(1) | PL(2) | PL(3) | PL(4) | PL(5) | PL(6) | PL(7) |
|---|---|---|---|---|---|---|---|
| SONGS | $A_1$<br>$A_2$<br>$A_3$<br>⋮<br>$A_a$ | $B_1$<br>$B_2$<br>$B_3$<br>⋮<br>$B_b$ | $C_1$<br>$C_2$<br>$C_3$<br>⋮<br>$C_c$ | $D_1$<br>$D_2$<br>$D_3$<br>⋮<br>$D_d$ | $E_1$<br>$E_2$<br>$E_3$<br>⋮<br>$E_e$ | $F_1$<br>$F_2$<br>$F_3$<br>⋮<br>$F_f$ | $G_1$<br>$G_2$<br>$G_3$<br>⋮<br>$G_g$ |
| TEMPO [bpm] | 0 TO 69 | 70 TO 119 | 120 TO 139 | 140 TO 159 | 160 TO 179 | 180 TO 209 | 210 AND HIGHER |

| t | MT(t) |
|---|---|
| 01:00:00 | 120 |
| 01:00:01 | 121 |
| 01:00:02 | 123 |
| 01:00:03 | 121 |

WALKING TEMPO MT(t)

| t | m_MT(t) |
|---|---|
| 01:00:00 | 120 |
| 01:00:05 | 121 |
| 01:00:10 | 140 |
| 01:00:15 | 145 |

AVERAGE WALKING TEMPO m_MT(t)

FIG.9A

| n | MD(n)lower | MD(n)upper | TN |
|---|---|---|---|
| 1 | 70 | 119 | 2 |
| 2 | 120 | 139 | 3 |
| 3 | 160 | 179 | 5 |
| 4 | 180 | 209 | 6 |

UNIT:bpm

FIG.9B

| n | MD(n)lower | MD(n)upper | TN |
|---|---|---|---|
| 5 | 0 | 69 | 1 |
| 6 | 140 | 159 | 4 |
| 7 | 210 | 999 | 7 |

UNIT:bpm

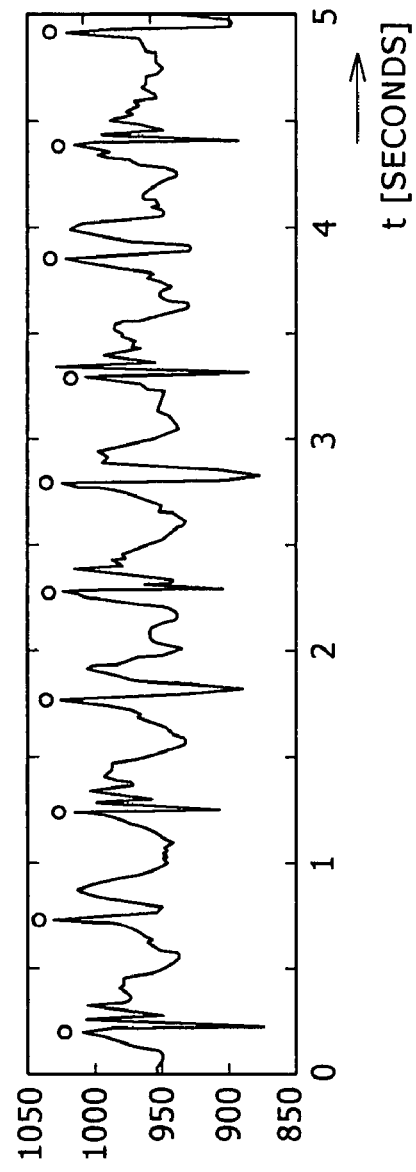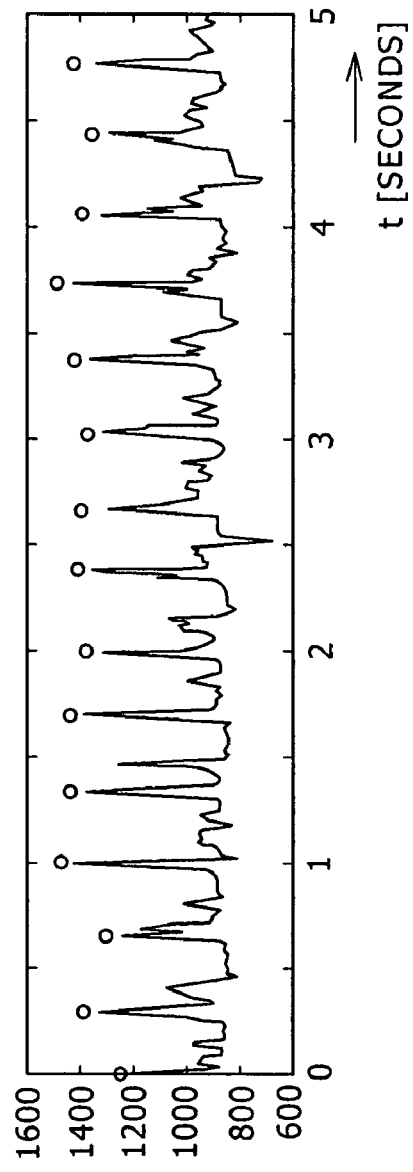

CONTENT REPRODUCING APPARATUS, AUDIO REPRODUCING APPARATUS AND CONTENT REPRODUCING METHOD

CROSS REFERENCES TO RELATED APPLICATIONS

The present invention contains subject matter related to Japanese Patent Application JP 2006-040052 filed in the Japanese Patent Office on Feb. 17, 2006, the entire contents of which being incorporated herein by reference.

BACKGROUND OF THE INVENTION

1. Field of the Invention

The present invention relates to a content reproducing apparatus, an audio reproducing apparatus, and a content reproducing method.

2. Description of the Related Art

In recent years, growing numbers of people, increasingly conscious of their health conditions, have come to take up walking, jogging, or running as a preferred way to maintain and improve their health or stay generally in shape. To obtain a certain level of salutary effects from such activities usually demands the people to spend suitably prolonged periods of time on their athletic pursuit.

There have been proposed a number of audio reproducing apparatuses designed to support people in walking or running. Some of the proposed apparatuses are disclosed illustratively in Japanese Patent Laid-Open Nos. 2001-299980, 2003-177749, and 2005-156641. One such apparatus is structured to be easy to carry by a user and stores songs of variable tempos. When the user takes a walk, for example, the apparatus detects the tempo of the walking and lets the user listen to songs of the tempo fit for the detected pace of walking. The tempo of walking is represented illustratively by the number of steps per unit time (e.g., per minute) and the tempo of songs by the number of beats per minute.

For example, if the walking tempo is 120 bpm (beats per minute), then the apparatus reproduces songs at a tempo of 120 bpm, such as marches. This type of audio reproducing apparatus allows the user to walk rhythmically in keeping with the tempo of the songs being played. The apparatus is thus supposed to afford the user a pleasing walking experience.

In this specification, the terms "walking" and "running" will be used separately only if these two activities need to be distinguished from each other. If there is no specific need to separate these activities, they may be simply referred to as walking or walk/run.

SUMMARY OF THE INVENTION

Walking-support audio reproducing apparatuses of the above-outlined type generally utilize acceleration sensors to detect the user's bodily movements in terms of acceleration. The acceleration thus detected and output by the sensor is analyzed so as to determine the tempo of the user's walking.

FIGS. 11A and 11B show typical waveforms derived from a detection output from an acceleration sensor. FIG. 11A gives a waveform of a user during walking, and FIG. 11B illustrates a waveform of the same user during running. In both cases, the waveforms were acquired by a walking-support audio reproducing apparatus hung by a neck strap from the neck of the user who was walking or running. In FIGS. 11A and 11B, the horizontal axis stands for time and the vertical axis for the output voltage (in mV) from the acceleration sensor.

In these waveforms, the peaks indicated with small circles represent changes in acceleration caused by the impact of the user's foot hitting the ground. The periodicity of these peaks thus corresponds to the tempo of walking. The peaks with no circles attached stand for changes in acceleration caused by the audio reproducing apparatus swaying by itself or hitting the user's body during swing motion. As such, the latter peaks may be regarded as noise. With these characteristics taken into consideration, analyses of the waveforms in FIGS. 11A and 11B derived from the detection output from the sensor should permit detection of the user's walking tempo.

In practice, however, most apparatuses of the above type do not take into account the noise experienced in analyzing the walking tempo based on the detection output as shown in FIGS. 11A and 11B. In the waveforms of FIGS. 11A and 11B, a noise-incurred peak detected near a midpoint between two adjacent circle-marked peaks representative of the walking tempo can be interpreted erroneously as another peak attributable to walking. Because such false measurements are apparently consistent with the walking-triggered peak pattern, the audio reproducing apparatus often leaves the error uncorrected. In addition, unlike in normal times the audio reproducing apparatus often has difficulty in correctly performing spectrum analysis and autocorrelation calculations of the user's movements during transient times. In such cases, the tempo detected from walking can take on a highly unlikely value.

The present invention has been made in view of the above circumstances and provides arrangements for overcoming the above and other deficiencies of the related art.

In carrying out the invention and according to one embodiment thereof, there is provided a content reproducing apparatus including: a sensor; a discrimination circuit configured to discriminate whether a movement of a user is a first movement or a second movement based on a detection output from the sensor; a storage configured to store contents; a reproduction circuit configured to reproduce the contents; and a control circuit configured to supply the reproduction circuit with contents retrieved from the storage in accordance with a discrimination output from the discrimination circuit.

Preferably, the content reproducing apparatus may further include an analysis circuit configured to analyze tempos of the first movement or the second movement of the user in accordance with the detection output from the sensor. The analysis circuit may change analysis algorithms for analyzing the tempos based on the discrimination output from the discrimination circuit and the control circuit may retrieve contents from the storage in accordance with the tempo analyzed by the analysis circuit.

Preferably, the first movement and the second movement of the user may be walking and running respectively.

According to another embodiment of the present invention, there is provided a content reproducing method including the steps of: discriminating whether a movement of a user is a first movement or a second movement based on a detection output from a sensor; and supplying a reproduction circuit with contents retrieved from a storage storing the contents in accordance with a discrimination output from the discriminating step.

According to a further embodiment of the present invention, there is provided a storage medium which stores a computer-readable program for causing a computer to execute a procedure including the steps of: discriminating whether a movement of a user is a first movement or a second movement based on a detection output from a sensor; and supplying a reproduction circuit with contents retrieved from a storage storing the contents in accordance with a discrimination output from the discriminating step.

According to an embodiment of the present invention, as outlined above, the analysis algorithms in use are changed between walking and running. That means an optimal algorithm can be selected to analyze the tempos of walking or running. The selective algorithm usage translates into appreciably fewer errors in the result of the analysis than before.

BRIEF DESCRIPTION OF THE DRAWINGS

FIG. 2 is a tabular view explanatory of the present invention;

FIG. 3 is a schematic view of lists explanatory of the present invention;

FIGS. 9A and 9B are tabular views explanatory of the present invention;

FIGS. 11A and 11B are waveform charts explanatory of the present invention.

Figure 1:
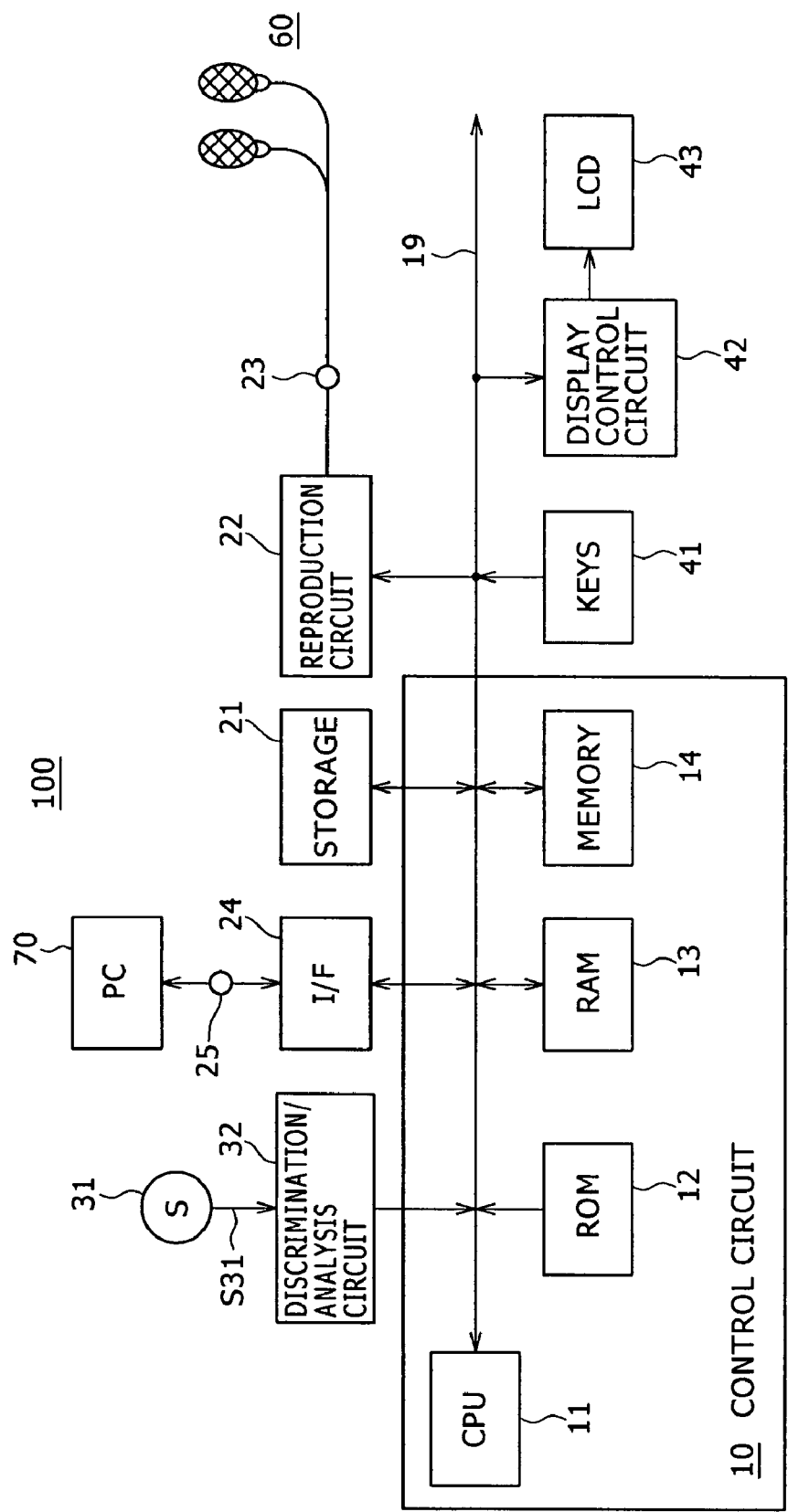
FIG. 1 is a schematic flow diagram showing how an embodiment of the present invention is structured.

DETAILED DESCRIPTION OF THE PREFERRED EMBODIMENTS (1) Overview of the Present Invention In the past, analyzing the detection output from the acceleration sensor often led to errors as mentioned above. That was because the tempos of the user's walk/run were obtained using the same analysis algorithm regardless of the difference between walking and running in terms of waveforms derived from the acceleration sensor detection output, as illustrated in FIGS. 11A and 11B.

In view of such circumstances, the present invention envisages brining about the following four major phases:

(A) The detection output from the acceleration sensor is analyzed to discriminate whether the user's movement is walking or running.

(B) The detection output from the acceleration sensor is analyzed to obtain the tempos of the user's walking or running.

(C) Upon analysis in phase (B) above, analysis algorithms are changed between walking and running.

(D) The changing of the analysis algorithms in phase (C) above is based on a discrimination output from phase (A) above.

(2) Discrimination Between Walking and Running

As shown in FIGS. 11A and 11B, the peaks in waveforms derived from the detection output from the acceleration sensor differ significantly between walking and running in periodicity and amplitude. The waveform patterns also differ appreciably between the two modes of physical activity. It is thus possible to discriminate whether the user's movement is walking or running based on both the difference in terms of periodicity and amplitude of the waveform peaks stemming from the acceleration sensor detection output and the difference in waveform patterns.

(2-1) Difference in Peak Periodicity

Generally, the speed of walking is 50 to 100 m/min and the speed of running is 140 m/min or higher. The average human step is 70 cm for men and 65 cm for women.

It is therefore determined that the average man is walking if the number of steps taken is fewer than 143 per minute and is running if the step count is 200 per minute or larger. Likewise it is determined that the average woman is walking if the number of steps taken is fewer than 153 per minute and is running if the step count is 215 per minute or larger.

(2-2) Difference in Waveform Amplitude

The magnitude of the impact on the user's body from the user's physical activity is about 1.1 to 1.2 times the user's weight during walking and about three to four times the body weight during running. The difference in impact between the two modes of activity is attributable to the fact at least one of the user's feet is on the ground during walking while the user's both feet can be momentarily off the ground during running. It follows that walking and running can be distinguished from each other by detecting the varying amplitude in waveforms derived from the acceleration sensor detection output.

(2-3) Difference in Waveform Pattern

The periodic waveform patterns derived from the acceleration sensor detection output prove to be distinctly different between walking and running when subjected to autocorrelation calculations. Performing autocorrelation calculations on the waveforms stemming from the acceleration sensor detection output allows noise and fluctuations to be removed from the waveforms.

(2-4) How to Discriminate Between Walking and Running

According to an embodiment of the present invention, the techniques outlined in paragraphs (2-1) through (2-3) above are used to discriminate between walking and running. The result from using each of the techniques is evaluated for further discrimination between walking and running. Given the result of such discrimination, it is possible to determine an optimal algorithm for acquiring the tempos of walking or running through analysis of the acceleration sensor detection output.

(3) Preferred Embodiments

One preferred embodiment of the present invention is a walking-support audio reproducing apparatus furnished with play lists. With the tempo of the user's walking detected, the audio reproducing apparatus may reproduce songs from the play list that corresponds to the detected walking temp.

(3-1) Typical Structure of the Audio Reproducing Apparatus

FIG. 1 is a schematic flow diagram showing a typical structure of a walking-support audio reproducing apparatus 100 embodying the present invention. The audio reproducing apparatus 100 may be used either as a walking-support apparatus or as a general-purpose portable music player. Although not shown, the apparatus has a structure and a shape small enough and compact enough to be carried around by the user illustratively in his or her pocket during walking.

The audio reproducing apparatus 100 has a system control circuit 10 composed of a microcomputer. The control circuit 10 includes a CPU 11 for executing programs, a ROM (read only memory) 12 that holds various data, a RAM (random access memory) 13 that provides a work area, and a nonvolatile memory 14. The memories 12, 13 and 14 are connected to the CPU 11 via a system bus 19.

In the above setup, the nonvolatile memory 14 serves to retain diverse information about the audio reproducing apparatus 100 and its user. The nonvolatile memory 14 is illustratively made up of a flash memory and contains a conversion table such as one (CNVTBL) shown in FIG. 2.

The conversion table CNVTBL is used illustratively to convert the tempos of the user's walking and of songs into tempo numbers TN. In the conversion table CNVTBL, the tempos of the user's walking and of songs are classified into seven categories represented by serial tempo numbers TN (=1 to 7), as shown in FIG. 2 (the categories are "0 to 69 bpm," "70 to 119 bpm," . . . , "210 to 999 bpm" as indicated).

With the conversion table CNVTBL of FIG. 2 in use, a detected tempo will be converted to TN=2 if the tempo falls into the range of, say, 70 to 119 bpm, and to TN=3 if it falls illustratively into the range of 120 to 139 bpm.

The nonvolatile memory 14 also contains play lists PL(1) through PL(7) as shown in FIG. 3. The play lists PL(1) through PL(7) have songs registered therein by tempo. The numbers one through seven of the play lists correspond to the tempo numbers one through seven in the conversion table CNVTBL. The songs having the tempo applicable to a given tempo number TN are registered in the play list PL(TN) of the corresponding number.

More specifically, songs A1 through Aa with their tempos falling between zero and 69 bpm (TN=1) are registered in the play list PL(1); songs B1 through Bb with their tempos between 70 and 119 bpm (TN=2) are registered in the play list PL(2); and so on. Songs G1 through Gg with their tempos at or higher than 210 bpm (TN=7) are registered in the play list PL(7).

The audio reproducing apparatus 100 also has a storage 21. The storage 21 accumulates or stores music data and digital audio data to be reproduced as songs. For that purpose, the storage 21 is constituted by a large-capacity flash memory or by a small hard disk drive. Illustratively, the music data held in the storage 21 is digital audio data compressed in MP3 (MPEG-1/Audio Layer 3, MPEG means Motion Picture Experts Group) format.

The storage 21 is connected to the system bus 19. A reproduction circuit 22 is also connected to the system bus 19. The reproduction circuit 22 is made up of a decoder circuit, a D/A (digital to analog) converter circuit, and an output amplifier. The decoder circuit decompresses compressed music data back to the original audio data. The D/A converter circuit converts the digital audio data into an analog audio signal.

Music data retrieved from the storage 21 is supplied to the reproduction circuit 22. The reproduction circuit 22 decompresses the supplied music data and converts the decompressed data to an analog audio signal. Following the D/A conversion, the analog audio signal is output to a headphone jack 23 that is connected with headphones 60.

An interface circuit 24 is also connected to the system bus 19. Music data is fed into the control circuit 10 from an externally furnished personal computer 70 through an input connector 25 and the interface circuit 24 to be stored into the storage 21.

This embodiment of the invention is furnished with a three-dimensional acceleration sensor 31 as a detection device that detects the walking tempo of the user carrying the audio reproducing apparatus 100 around. The acceleration sensor 31 detects the motions, acceleration, vibrations, and swaying of the audio reproducing apparatus 100 representative of the user's bodily movements (i.e., in terms of acceleration). A detection output S31 from the acceleration sensor 31 is fed to a discrimination/analysis circuit 32.

The discrimination/analysis circuit 32, as will be discussed later in more detail, analyzes the detection output S31 coming from the acceleration sensor 31 so as to detect the user's walk/run tempo. Upon analysis, the discrimination/analysis circuit 32 discriminates between walking and running using the procedure discussed in the paragraph (2) above in order to effect switchover to an optimal algorithm for analyzing the walking or running.

Various operation keys are connected to the system bus 19. The system bus 19 is further connected with a display device such as an LCD (liquid crystal display) 43 by way of a display control circuit 42. In this setup, the operation keys are used illustratively to accomplish the following: selecting the audio reproducing apparatus 100 either as a general-purpose portable music player or as a walking-support apparatus; selecting any one of different operation modes; selecting songs to play; and making other settings. The LCD 43 serves to display results of the operation keys 41 having been operated and information about the song being reproduced.

(3-2) Operations (3-2-1) Storing the Songs

The music data of a song desired to be stored into the audio reproducing apparatus 100 is prepared beforehand in compressed format on the personal computer 70. With the personal computer 70 connected to the audio reproducing apparatus 100, a suitable transfer program is carried out on the PC to designate transfer of the music data in question.

The music data prepared on the personal computer 70 is then supplied to the audio reproducing apparatus 100 through the connector 25. The supplied music data is admitted into the audio reproducing apparatus 100 through the interface circuit 24 under control of the CPU (central processing unit) 11. The data is stored into the storage 21.

(3-2-2) Creating the Play Lists PL(1) Through PL(7)

Giving a command to create play lists causes the audio reproducing apparatus 100 to create skeleton play lists PL(1) through PL(7) (i.e., play lists with no contents inside). The tempo of the song placed into the storage 21 is analyzed using the procedure discussed in the paragraph (3-2-1) above. The analyzed tempo is converted to a tempo number TN by use of the conversion table CNVTBL. The analyzed song is registered in the play list PL(TN) corresponding to the tempo number resulting from the conversion from among the play lists PL(1) through PL(7).

Illustratively, if an analysis of a given song reveals that it has a tempo of 80 bpm, the tempo is converted by the conversion table CNVTBL into TN=2. The song having that tempo is then registered in the play list PL(2).

The tempo of a given song is acquired by performing a spectrum analysis of its music data and by obtaining an auto-correlation function of the data. When the music data of a song is prepared on the personal computer 70, information indicative of the tempo of that song may be added to the music data as meta information that may later be used to identify the tempo. When the song is to be registered into any one of the play lists PL(1) through PL(7), the registration may be carried out using a file name of the corresponding music data together with the song title and the name of the artist involved.

(3-2-3) Using the Embodiment as a General-Purpose Portable Music Player, for Music Reproduction In this case, giving a command to reproduce a stored song causes the audio reproducing apparatus 100 to retrieve the applicable music data from the storage 21. The retrieved music data is supplied to the reproduction circuit 22 for data decompression and digital-to-analog conversion.

The reproduction circuit 22 thus outputs an analog audio signal derived from the retrieved music data. The analog audio signal is fed to the headphones 60 allowing the user to listen to the reproduced song. The title of the song being reproduced is displayed on the LCD 43.

Retrieval of music data from the storage 21 is controlled in accordance with a currently established reproduction mode. That is, the retrieved music data may be subjected illustratively to single-song reproduction, all-song continuous reproduction, random reproduction, or repeat reproduction. In this manner, the audio reproducing apparatus 100 can be utilized as a general-purpose portable music player.

A command may also be given to designate one of the play lists PL(1) through PL(7) for reproduction. In such a case, only the songs registered in the designated play list are reproduced selectively. Illustratively, when going to bed, the user might want to designate the play list PL(1) to reproduce songs of slow tempos.

(3-2-4) Using the Embodiment as a Walking-Support Apparatus for Music Reproduction In this case, the audio reproducing apparatus 100 is used to reproduce songs having tempos commensurate with the user's walking speed. Giving a command to reproduce such songs causes the acceleration sensor 31 and discrimination/analysis circuit 32 to detect the tempo of the user's walking. The walking tempo thus detected is converted by the conversion table CNVTBL into a corresponding tempo number TN. Of the play lists PL(1) through PL(7), the play list PL(TN) corresponding to the tempo number TN derived from the conversion is selected. Then one of the songs registered in the selected play list PL(TN) is selected.

The music data of the selected song is retrieved from the storage 21 and sent to the reproduction circuit 22 for data decompression and digital-to-analog conversion. By the same procedure as that discussed in the paragraph (3-2-3) above, the selected song is reproduced and listened to by use of the headphones 60. Because the tempo of the song being reproduced is commensurate with the user's walking speed, the user can walk rhythmically and pleasantly in time with the song.

During the walking, the current tempo number TN is compared with the preceding tempo number TN. A difference detected in the comparison between the two numbers indicates a change in the walking tempo. In that case, another play list PL(TN) corresponding to the current walking tempo TN is selected and songs are reproduced selectively from the newly selected play list PL(TN).

As will be discussed later, the analysis of the user's walking tempo by the discrimination/analysis circuit 32 is supplemented by the determination of whether the user's current activity is walking or running. That is, when play lists or songs are to be selected by the above-described procedure, the result of the determination of whether the user's motion comes from walking or running may be additionally taken into consideration.

(4) Typical Structure of the Discrimination/Analysis Circuit 32

Figure 4:
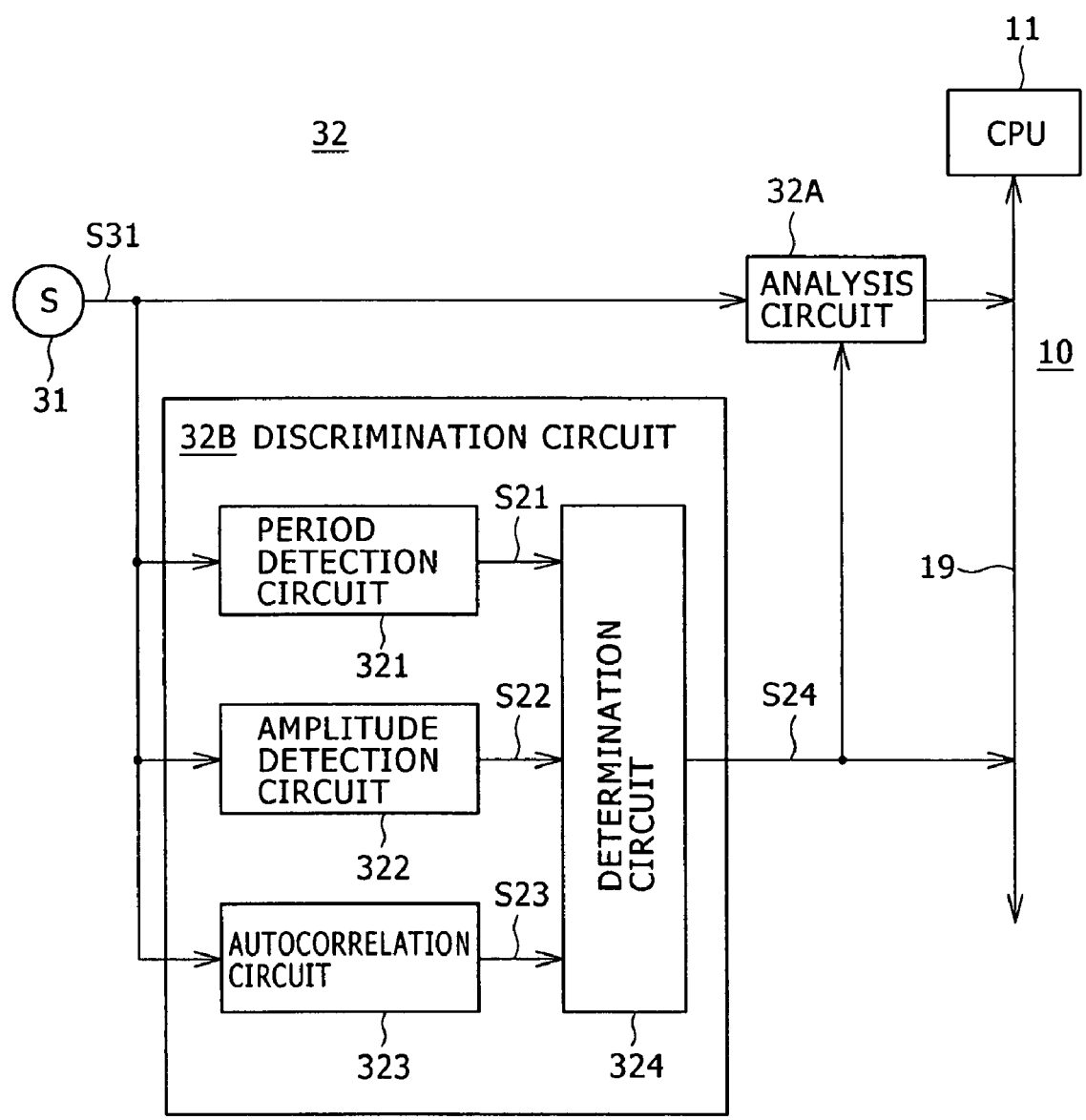
FIG. 4 is a schematic flow diagram showing part of the embodiment of the present invention.

FIG. 4 is a schematic flow diagram showing a typical structure of the discrimination/analysis circuit 32. As shown in FIG. 4, the discrimination/analysis circuit 32 is made up of an analysis circuit 32A and a discrimination circuit 32B. The detection output S31 from the acceleration sensor 31 is supplied to the analysis circuit 32A. By analyzing what is supplied using an appropriate analysis algorithm, the analysis circuit 32A detects the tempo of the user's walking or running. An output from the analysis circuit 32A following the detection is fed to the control circuit 10 through the system bus 19.

The detection output S31 from the acceleration sensor 31 is also supplied to the discrimination circuit 32B. In this setup, the discrimination circuit 32B is constituted by a period detection circuit 321, an amplitude detection circuit 322, an autocorrelation circuit 323, and a determination circuit 324. The circuits 321 through 323 are each designed to process the detection output S31 by a different method when detecting the probability of the user's movement being either walking or running. The determination circuit 324 evaluates outputs S21 through S23 coming from the circuits 321 through 323, thereby determining whether the user is walking or running.

Illustratively, the period detection circuit 321 subject the detection output S31 from the acceleration circuit 31 to spectrum analysis in order to detect periodicity of peaks (marked by small circles in FIG. 11). On the basis of the periodicity thus detected, the period detection circuit 321 acquires the probability of the user either walking or running by use of the procedure discussed in the paragraph (2-1) above. The resulting detection output S21 from the period detection circuit 321 is fed to the determination circuit 324.

The amplitude detection circuit 322 illustratively demodulates the detection output S31 from the acceleration sensor 31 to detect the amplitude of the peaks (marked by small circles in FIG. 11) in the output S31. Based on the values of amplitude thus detected, the amplitude detection circuit 322 acquires the probability of the user either walking or running by use of the procedure discussed above in the paragraph (2-2) above. The resulting detection output S22 from the amplitude detection circuit 322 is forwarded to the determination circuit 324.

The autocorrelation circuit 323 performs autocorrelation calculations on the detection output S31 from the acceleration sensor 31 to obtain the magnitude of autocorrelation in the output S31. On the basis of the magnitude of autocorrelation thus acquired, the autocorrelation circuit 323 detects the probability of the user either walking or running by use of the procedure discussed in the paragraph (2-3) above. The resulting detection output S23 from the autocorrelation circuit 323 is sent to the determination circuit 324.

The determination circuit 324 evaluates the detection outputs S21 through S23 coming from the circuits 321 through 323 respectively in order to determine whether the user's activity is walking or running. The result of the determination is output as a discrimination output S24 of the discrimination circuit 32B. Illustratively, if the detection outputs S21 through S23 each indicate the probability of the user's walking or running in percentage points, these values are weighted before they are added up. The addition allows the determination circuit 324 to determine whether the user is walking or running. If the detection outputs S21 through S23 each indicate the probability of walking or running in binary form, the determination circuit 324 may determine whether the user is walking or running by a majority decision derived from the outputs S21 through S23.

The discrimination output S24 from the discrimination circuit 32B is supplied as a control parameter to the analysis circuit 32A. Given the discrimination output S24, the analysis circuit 32A switches accordingly to a suitable algorithm for analyzing the detection output S31 from the acceleration sensor 31. The analysis algorithm derived from the switchover is an optimal algorithm for analyzing the tempo of the user's walking or running. In this setup, the discrimination output S24 is also supplied to the control circuit 10.

The user's walking or running is analyzed specifically by different methods as follows: in the waveform of the detection output S31 of FIG. 11A observed during walking, near the peaks (marked by small circles) correctly representing the tempo of walking also appear other peaks that can lead to error. Since these peaks do not differ considerably in amplitude, they are first subjected to autocorrelation calculations. This process roughly determines the periodicity of the peaks. With the coarse periodicity thus determined and with a given peak spotted, a time frame is assumed in the probable position of the next peak, to see if such a peak exists in the frame. If a plurality of peaks are found in the time frame, the frame is narrowed so as to select a peak that is close to a peak period. If no such peak is found in the time frame, the frame is widened in the search for a periodical peak. The periodical peak thus detected is stored temporarily as the basis for detecting the next peak.

In the waveform of the detection output S31 of FIG. 11B observed during running, the detected peaks are much more distinct in amplitude than the peaks observed during walking. This makes it possible to handle only the waveform peaks that exceed a predetermined threshold level. The process is implemented using a level comparator or a nonlinear amplifier. In the case of FIG. 11B, the threshold level may be set illustratively for 1,200. With the threshold determined, peaks exceeding it are observed and the interval between two adjacent peaks is regarded as a peak period. A search is then made for a waveform peak close to the next period. The periodical peak thus detected is used also in this case as the basis for detecting the next peak.

Many people are unconsciously in the habit of exerting a more force on either foot than the other during walking or running. For that reason, it is preferred that the length of time for analysis using the above-mentioned autocorrelation calculations include a peak period of not one step but two steps. When a difference is observed between the right and left feet in terms of the force exerted thereon, this characteristic may also be taken into consideration in the search for waveform peaks representative of the tempo of walking.

The waveforms in FIGS. 11A and 11B vary depending on where the acceleration sensor 31 is installed, how the audio reproducing apparatus 100 is attached or held, what type of shoes is worn by the user, or what kind of condition the terrain or the floor is in on which to walk or run. In view of these factors, the analysis methods discussed above may be supplemented by such procedures as band-pass filtering and frequency spectrum analysis for selective application of the parameters involved to the analysis of walking or running.

Where the discrimination/analysis circuit 32 of FIG. 4 is in use, the detection output S31 from the acceleration sensor 31 is analyzed as described above for discrimination between walking and running representative of the user's movement. The output of the discrimination is used to change analysis algorithms for analyzing the tempo of walking or running. This makes it possible to adopt an optimum algorithm for analyzing the tempo of walking or running, whereby the probability of error is lowered significantly.

(5) Walking Tempo

In the paragraphs that follow, the tempo of walking in general and a typical method for creating the conversion table CNVTBL will be discussed.

(5-1) Observations

Figure 5:
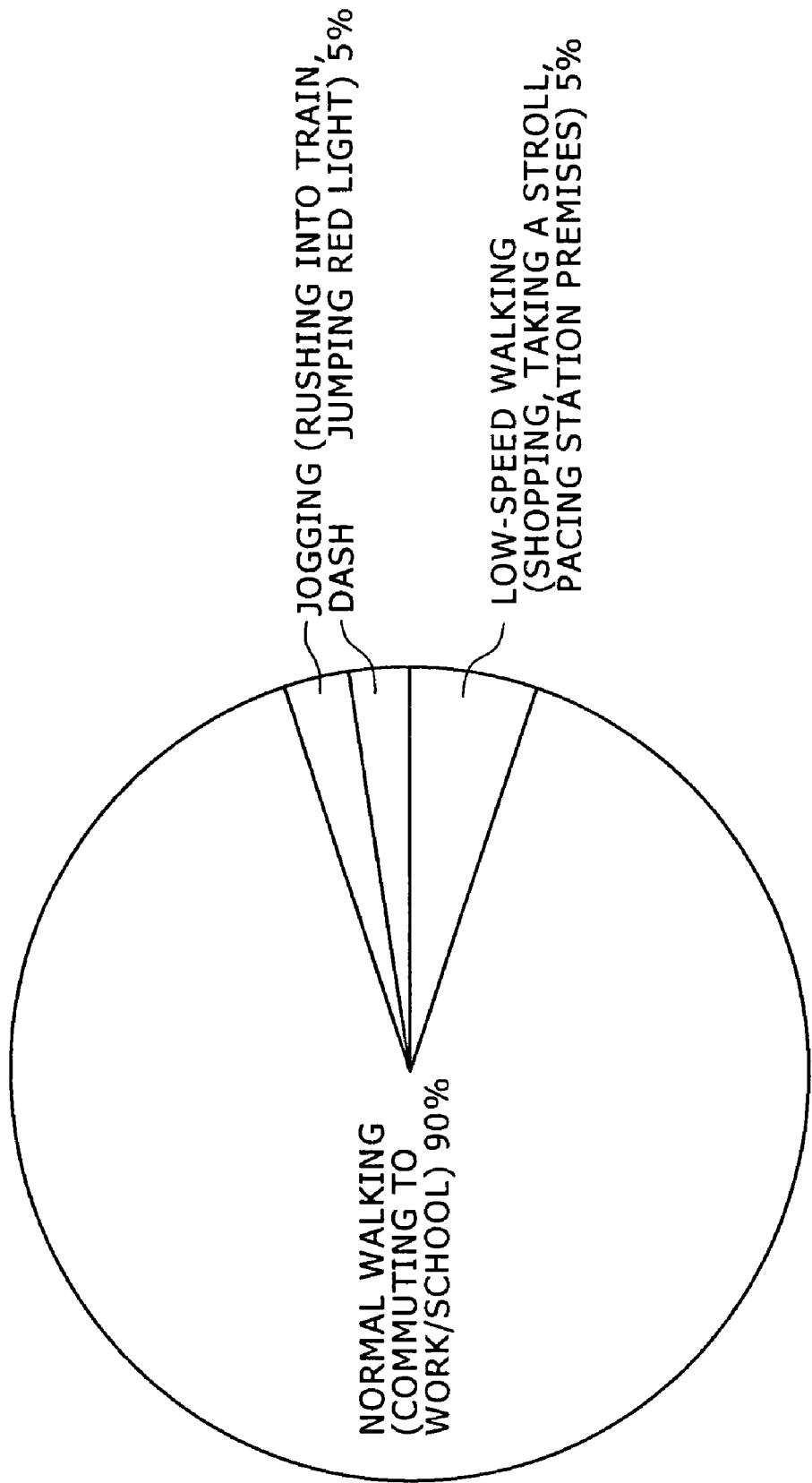
FIG. 5 is a graphic representation explanatory of the present invention.

Fourteen test subjects (eight adult males and six adult females) were observed in their walking habits in daily life. The observations revealed that their walking movements could be roughly classified into four groups: low-speed walking, normal walking, jogging, and dash as shown in FIG. 5. These four groups of walking may be applied by extension to the walking activity in general in everyday life.

Figure 6:
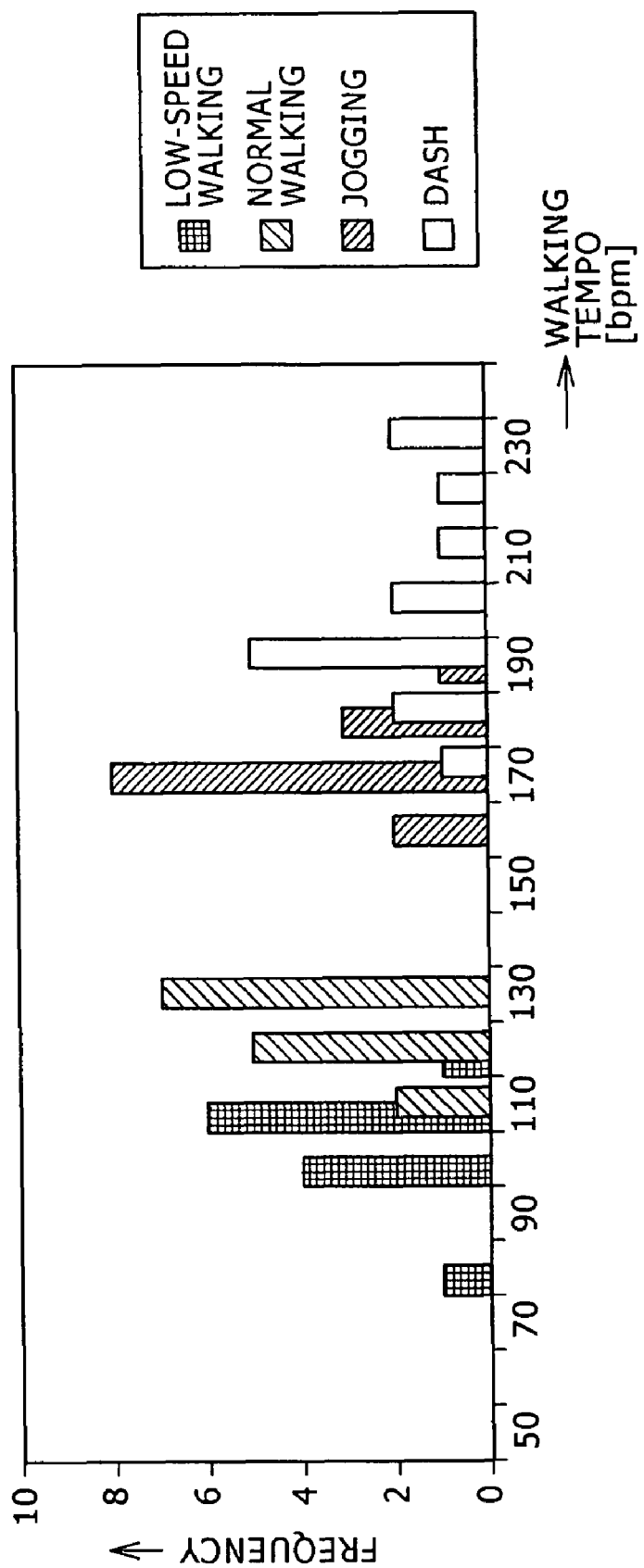
FIG. 6 is another graphic representation explanatory of the present invention.

The test subjects were also measured for their walking tempos. The resulting measurements are shown graphically in FIG. 6. The horizontal axis of FIG. 6 stands for walking tempos (i.e., average tempo of walking per unit time) and the vertical axis denotes frequency (i.e., number of people). In FIG. 6 and subsequent figures, the walking tempos are shown rounded to increments of 10 bpm.

The measurements above reveal that the walking tempos in daily life are not uniformly distributed; they tend to be included in one of the groups. It is also revealed that the walking tempos of less than 69 bpm, 140 to 159 bpm, and 240 bpm and higher rarely occur in everyday life. For each group, it is possible to obtain the mean value, standard deviation, and coefficient of variation of the tempos involved and to estimate their ranges.

People are thought to select automatically an optimally efficient state of transport energy consumption when walking or running. The walking tempos in the range of 140 to 159 bpm come between walking and jogging and fall into the state generally known as race walking. In daily life, people rarely, if ever, walk in the state of race walking. Hence the resulting measurements obtained as described above.

Each user has a particular pattern of walking as mentioned earlier. The audio reproducing apparatus 100 is arranged to learn its user's pattern of walking. The results of such learning are then turned into the conversion table such as one (CNVTBL) shown in FIG. 2.

(5-2) Learning of Walking Tempos

Figure 7:
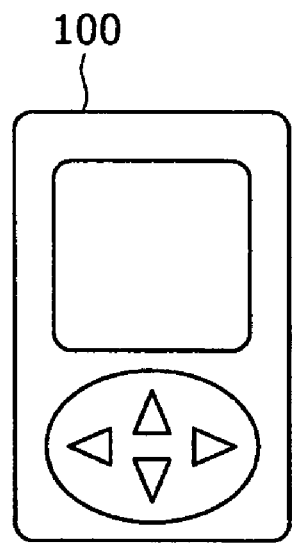
FIG. 7 is a schematic view with tables explanatory of the present invention.

For the purpose of learning, the user carries the audio reproducing apparatus 100 and takes a walk. During the walking, as shown in FIG. 7, the audio reproducing apparatus 100 measures instantaneous walking tempos MT(t) at intervals of several milliseconds to several seconds. Mean walking tempos m_MT(t) at intervals of several seconds are then calculated from the measured walking tempos MT(t). FIG. 7 shows results obtained when the audio reproducing apparatus 100 measured the walking tempos MT(t) at intervals of one second and the measurements were used as the basis for calculating the mean walking tempos m_MT(t) at intervals of five seconds.

The walking tempos m_MT(t) thus calculated are accumulated in the storage 21 of the audio reproducing apparatus 100. This is how the reproducing apparatus 100 learns the user's walking tempos m_MT(t).

Once the walking tempos are learned, the audio reproducing apparatus 100 is connected to the personal computer 70 as shown in FIG. 1. From the audio reproducing apparatus 100, the accumulated walking tempos m_MT(t) and timestamp information are transferred to the personal computer 70. If the personal computer 70 currently retains any past walking tempos m_MT(t) and timestamp information, they may be replaced by, or merged with, the newly transferred walking tempos m_MT(t) and timestamp information.

(5-3) Division of Walking Tempos into Groups

The personal computer 70 creates a histogram of walking tempo appearances based on the transferred walking tempos m_MT(t) and timestamp information. From the histogram, maximum values MD(i) max (i=1, 2, 3, . . . ) are detected and the detected values are taken as vertexes representing the walking tempos classified into groups MD(i).

Figure 8:
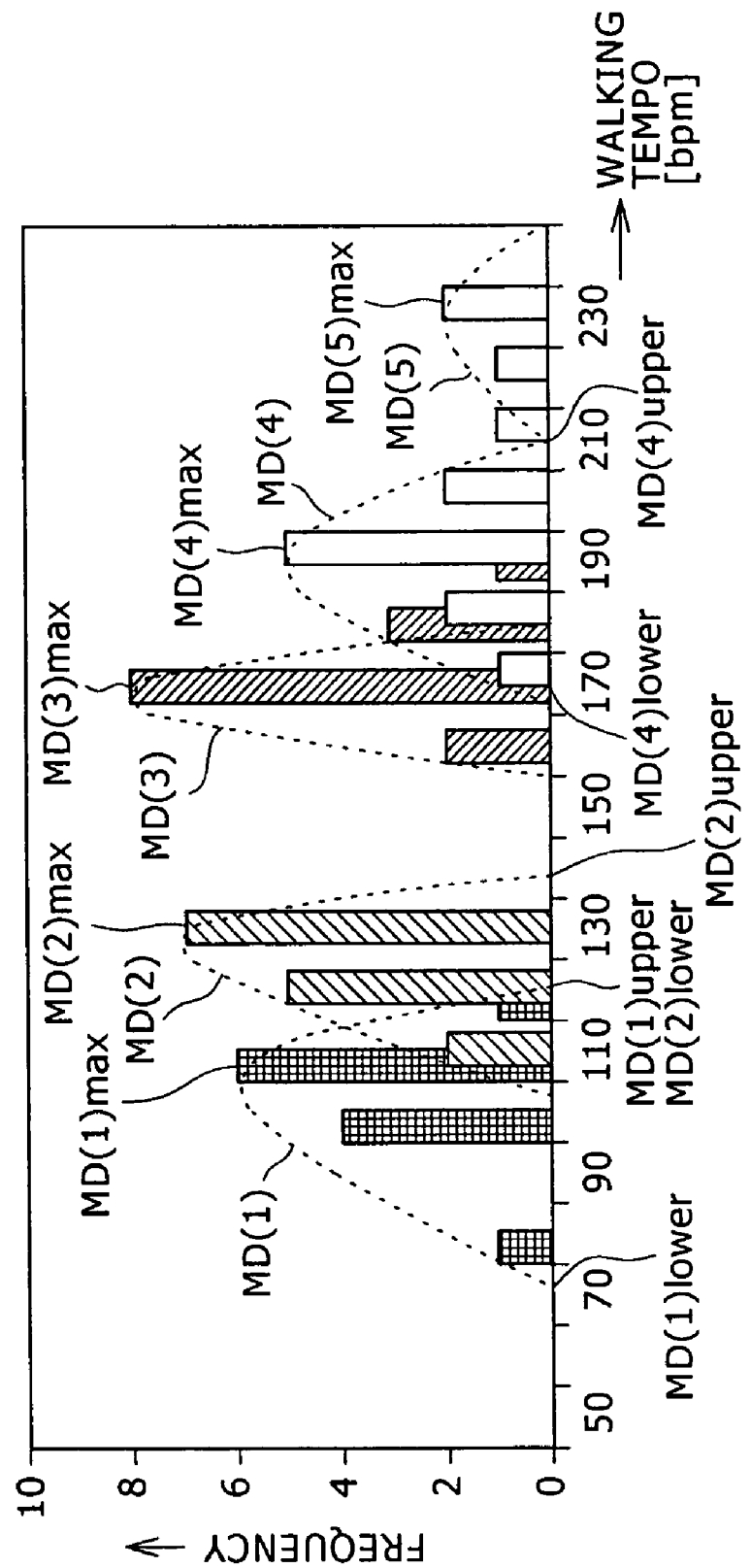
FIG. 8 is another graphic representation explanatory of the present invention.

FIG. 8 shows a typical histogram created from the walking tempos m_MT(t). The horizontal axis of FIG. 8 stands for the walking tempos m_MT(t) and the vertical axis denotes the number of walking tempo appearances. In this histogram, the maximum values are established as MD(1)max, MD(2)max, MD(3)max, MD(4)max, and MD(5)max on the horizontal axis from left to right. These maximum values MD(n)max (n=1 to 5) are taken as vertexes each topping one of the groups MD(n) in which the walking tempos are distributed.

For each of the groups MD(n), a lower limit value MD(n)lower and an upper limit value MD(n)upper are obtained. If a given group MD(n) does not overlap with any other group, attention is paid to both ends of the group MD(n); the value on the horizontal axis at which the number of appearances is zero is taken either as the lower limit value MD(n)lower or as the upper limit value MD(n) upper.

If two groups MD(n−1) and MD(n) overlap with each other, a median value between the maximum value MD(n−1) max of the group MD(n−1) and the maximum value MD(n) max of the group MD(n) is regarded both as the upper limit value MD(n−1)upper of the group MD(n−1) and as the lower limit value MD(n)lower of the group MD(n).

If the maximum value is positioned at the top or bottom end of the histogram as in the case of the maximum value MD(5) max of the group MD(5) in FIG. 8, that maximum value and the group associated with it are ignored.

When the groups MD(n) are reorganized using the above-described procedure, it is possible to obtain four pairs of the lower limit value MD(n)lower and upper limit value MD(n) upper (n=1 to 4) from the histogram of FIG. 8, as indicated in FIG. 9A.

The values n=1, 2, 3, 4 are associated with the tempo numbers TN=2, 3, 5, 6 respectively, as shown in the right-hand side column of FIG. 9A. At the same time, the ranges of walking tempos delimited by the lower limit value MD(TN) lower and upper limit value MD(TN)upper as designated by these variables TN are registered in the conversion table CNVTBL, along with the correspondence between the ranges and the variables TN. The registrations lead to preparation of the lines indicated by the variable TN=2, 3, 5, 6 in the conversion table CNVTBL shown in FIG. 2.

Where the walking tempos m_MT(t) are less than 69 bpm (too slow), between 140 and 159 bpm (race walking), and higher than 210 bpm (too fast) in FIG. 8, they correspond to the groups MD(5), MD(6) and MD(7) (n=5, 6, 7) in FIG. 9B respectively.

Figure 10:
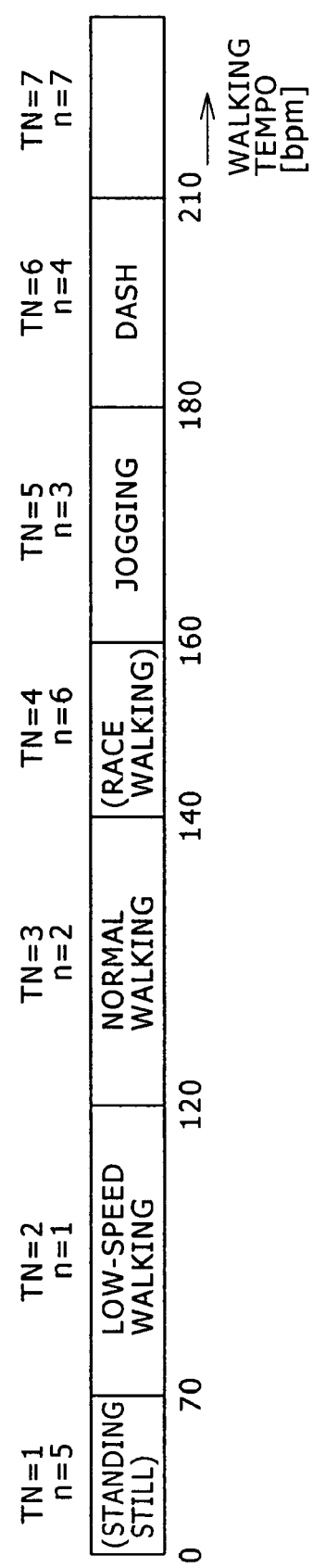
FIG. 10 is a diagrammatic view explanatory of the present invention.

The values n=5, 6, 7 are associated with the tempo numbers TN=1, 4, 7 respectively, as shown in the right-hand side column of FIG. 9B. At the same time, the ranges of walking tempos delimited by the lower limit value MD(TN)lower and upper limit value MD(TN)upper as designated by theses variables TN are registered in the conversion table CNVTBL, along with the correspondence between the ranges and the variables TN. The registrations lead to preparation of the lines indicated by the variable TN=1, 4, 7 in the conversion table CNVTBL shown in FIG. 2. FIG. 10 graphically summarizes the relationship between the ranges of walking tempos on the one hand and the tempo numbers TN on the other hand indicated in FIGS. 2, 9A and 9B.

The conversion table CNVTBL is thus created by the procedure discussed above. The created conversion table is transferred from the personal computer 70 to the audio reproducing apparatus 100 wherein the transferred table is retained illustratively in the memory 14.

(6) Conclusions

The above-described reproducing apparatus 100 analyzes the detection output S31 from the acceleration sensor 31 to discriminate whether the user's movement is walking or running, and changes analysis algorithms for detecting the tempos of the user's walking or running determined on the basis of the discrimination output. This makes it possible to use an optimal algorithm for analyzing the walking or running tempos and thereby to reduce errors significantly in the analysis.

Illustratively, the audio reproducing apparatus 100 creates the play lists PL(1) through PL(7) by walking tempo as shown in FIG. 3, discriminates which of the play lists PL(1) through PL(7) corresponds to the currently detected walking tempo m_MT(t), and selectively reproduces songs from the play list thus discriminated. That is, whether the walking tempo is slow or fast, the songs to be reproduced are automatically changed to suit the user's current movement. The user has a pleasant feeling that the reproducing apparatus 100 is selectively reproducing songs to match his or her physical activity at the present moment.

Because the play lists PL(1) through PL(7) have been acquired through learning, there is no need for the user to fine-tune the listed choices or make additional adjustments to the lists. Furthermore, the listings are affected very little by the user's physical conditions, variations among individual users, or fluctuations in a given user's walking.

(7) Others

In the foregoing description, the embodiment of the invention was shown using the seven play lists PL(1) through PL(7). Alternatively, there may be prepared one play list of songs at tempos of 69 bpm or lower, 14 play lists covering songs at tempos between 70 and 209 bpm in increments of 10 bpm, and one play list of songs at tempos of 210 bpm or higher. Any of these play lists may be selected for reproduction of the songs contained inside in keeping with the detected tempo of walking or running. As another alternative, there may be prepared two play lists, one covering songs at tempos of 139 bpm or lower and the other containing songs at tempos of 140 bpm or higher. Either of the two play lists may then be selected for reproduction of the songs contained inside in keeping with the detected tempo of walking or running.

The personal computer 70 may create the play lists PL(1) through PL(7) and transfer the created lists to the audio reproducing apparatus 100 together with the digital audio data constituting the songs held inside the lists. It is also possible for the audio reproducing apparatus 100 to have a standard conversion table CNVTBL installed therein beforehand. Every time the user takes a walk, the standard conversion table CNVTBL may be corrected or adjusted to reflect the user's own walking pattern. In this case, the longer the audio reproducing apparatus 100 is used, the more accurate the selection of songs to be reproduced in accordance with the user's unique walking pattern.

In the above-described example, the audio reproducing apparatus 100 was described as being hung from the user's neck by a neck strap. Alternatively, it might happen that the user wants to carry the apparatus around in a pocket of the clothes he or she wears or in a bag he or she carries. In such cases, appropriate analysis algorithms may be devised to address the tempos of the user keeping the apparatus in his or her pocket or bag while walking or running.

The discrimination/analysis circuit 32 may be implemented either by hardware such as a DSP (digital signal processor) or by software made up of programs performed by the CPU 11. Whenever any song to be reproduced is changed from the initial category, that change may be evaluated in terms of how the operation keys 41 are operated. The evaluations may then be used as the basis for subsequently selecting songs more to the user's taste. It is also possible for the user of the audio reproducing apparatus 100 to establish conditions for changing songs or to set or vary the lower limit value MD(n)lower and upper limit value MD(n)upper by himself or herself by taking a look at the histogram of FIG. 6.

The acceleration sensor 31 may be separated from the audio reproducing apparatus 100 and attached to, say, the headphones 60. In this case, the detection signal from the acceleration sensor 31 may be sent to the discrimination/analysis circuit 32 in wired or wireless fashion. The acceleration sensor 31 may be replaced by a speed sensor or by a gyro sensor. Furthermore, the music data may be integrated with video digital data.

It should be understood by those skilled in the art that various modifications, combinations, sub-combinations and alterations may occur depending on design requirements and other factor in so far as they are within the scope of the appended claims or the equivalents thereof.

What is claimed is:

1. A content reproducing apparatus comprising:
    a sensor;
    a discrimination circuit configured to identify, based on a detection output from said sensor, an estimated movement type of a user's movement from a plurality of movement types having different degrees of intensity;
    a storage configured to store contents;
    a reproduction circuit configured to reproduce said contents;
    an analysis circuit configured to use the estimated movement type identified by the discrimination circuit to change analysis algorithms for analyzing the detection output from the sensor to determine a tempo of the user's movement; and
    a control circuit configured to supply said reproduction circuit with contents retrieved from said storage in accordance with the tempo of the user's movement.

2. The content reproducing apparatus according to claim 1, wherein, in accordance with said tempo determined by said analysis circuit, said control circuit selects a predetermined play list from a plurality of play lists derived from said contents classified by a predetermined tempo, and retrieves applicable contents from said storage in accordance with the selected play list.

3. The content reproducing apparatus according to claim 1, wherein, in accordance with the estimated movement type identified by said discrimination circuit, said control circuit selects a predetermined play list from a plurality of play lists derived from said contents classified by a predetermined tempo, and retrieves applicable contents from said storage in accordance with the selected play list.

4. The content reproducing apparatus according to claim 1, wherein the plurality of movement types comprises at least one movement type of walking and at least one movement type of running.

5. The content reproducing apparatus according to claim 1, wherein said discrimination circuit includes at least a period detection circuit configured to discriminate whether said movement of said user is walking or running based on periodicity of peaks in a waveform derived from said detection output from said sensor.

6. The content reproducing apparatus according to claim 1, wherein said discrimination circuit includes at least an amplitude detection circuit configured to discriminate whether said movement of said user is walking or running based on amplitude of peaks in a waveform derived from said detection output from said sensor.

7. The content reproducing apparatus according to claim 1, wherein said discrimination circuit includes at least an auto-correlation circuit configured to discriminate whether said movement of said user is walking or running based on auto-correlation calculations of said detection output from said sensor.

8. The content reproducing apparatus according to claim 1, wherein said discrimination circuit includes:
    a plurality of detection circuits each configured to detect whether said movement of said user is walking or running by use of one of algorithms different from one another on the basis of said detection output from said sensor; and
    a determination circuit configured to determine whether said movement of said user is walking or running by evaluating detection outputs from said plurality of detection circuits and output the result of the determination as said discrimination output.

9. A content reproducing method comprising acts of:
    identifying, based on a detection output from a sensor, an estimated movement type of a user's movement from a plurality of movement types having different degrees of intensity;
    using the estimated movement type of the user's movement to analyze a tempo of the user's movement, comprising changing analysis algorithms for analyzing the tempo of said movement of said user based on said estimated movement type; and
    supplying a reproduction circuit with contents retrieved from a storage storing said contents in accordance with the tempo of the user's movement.

10. The content reproducing method according to claim 9, wherein the act of supplying comprises selecting, in accordance with results from said act of using the estimated movement type of the user's movement to analyze the tempo of the user's movement, a predetermined play list from a plurality of play lists derived from said contents classified by a predetermined tempo, and retrieving applicable contents from said storage in accordance with the selected play list.

11. The content reproducing method according to claim 9, wherein the act of supplying comprises selecting, in accordance with said estimated movement type of the user's movement a predetermined play list from a plurality of play lists derived from said contents, and retrieving applicable contents from said storage in accordance with the selected play list.

12. The content reproducing method according to claim 9, wherein the plurality of movement types comprises at least one movement type of walking and at least one movement type of running.

13. The content reproducing method according to claim 9, wherein said act of identifying includes at least discriminating whether said movement of said user is walking or running based on periodicity of peaks in a waveform derived from said detection output from said sensor.

14. The content reproducing method according to claim 9, wherein said act of identifying includes at least discriminating whether said movement of said user is walking or running based on amplitude of peaks in a waveform derived from said detection output from said sensor.

15. The content reproducing method according to claim 9, wherein said act of identifying includes at least discriminating whether said movement of said user is walking or running based on autocorrelation calculations of said detection output from said sensor.

16. The content reproducing method according to claim 9, wherein said act of identifying includes acts of:
   using a plurality of algorithms to detect whether said movement of said user is walking or running based at least in part on said detection output from said sensor;
   determining whether said movement of said user is walking or running by evaluating detection outputs from said plurality of algorithms; and
   outputting a result of the act of determining as said estimated movement type of the user's movement.

17. At least one storage medium which stores computer-readable instructions for causing a computer to execute a method comprising acts of:
   identifying, based on a detection output from a sensor, an estimated movement type of a user's movement from a plurality of movement types having different degrees of intensity;
   using the estimated movement type of the user's movement to change analysis algorithms for analyzing a tempo of the user's movement; and
   supplying a reproduction circuit with contents retrieved from a storage storing said contents in accordance with the estimated movement type of the user's movement.

18. The at least one storage medium of claim 17, wherein the plurality of movement types comprises at least one movement type of walking and at least one movement type of running.

* * * * *